(12) United States Patent
Drescher et al.

(10) Patent No.: US 9,880,357 B2
(45) Date of Patent: Jan. 30, 2018

(54) OPTICAL MODULE FOR INDUSTRIAL PLUG-IN CONNECTORS OF MODULAR DESIGN

(71) Applicant: Harting Electric GmbH & Co. KG, Espelkamp (DE)

(72) Inventors: Jan Drescher, Apelern (DE); Houssaine Lehna, Espelkamp (DE)

(73) Assignee: HARTING ELECTRIC GMBH & CO. KG, Espelkamp (DE)

( * ) Notice: Subject to any disclaimer, the term of this patent is extended or adjusted under 35 U.S.C. 154(b) by 0 days.

(21) Appl. No.: 14/771,303

(22) PCT Filed: Feb. 12, 2014

(86) PCT No.: PCT/DE2014/100054
§ 371 (c)(1),
(2) Date: Aug. 28, 2015

(87) PCT Pub. No.: WO2014/131397
PCT Pub. Date: Sep. 4, 2014

(65) Prior Publication Data
US 2016/0011376 A1    Jan. 14, 2016

(30) Foreign Application Priority Data
Mar. 1, 2013    (DE) .................. 10 2013 102 023

(51) Int. Cl.
*G02B 6/38*    (2006.01)
*G02B 6/32*    (2006.01)

(52) U.S. Cl.
CPC ............. *G02B 6/32* (2013.01); *G02B 6/3825* (2013.01); *G02B 6/3879* (2013.01); *G02B 6/3897* (2013.01); *G02B 6/3878* (2013.01)

(58) Field of Classification Search
CPC ........................ H01R 13/426; G02B 6/3825
(Continued)

(56) References Cited

U.S. PATENT DOCUMENTS 4,265,511 A  *  5/1981  Nicia ................. G02B 6/32
                                                     385/33
4,451,115 A  *  5/1984  Nicia ................. G02B 6/32
                                                     385/74
(Continued)

FOREIGN PATENT DOCUMENTS

CN    101031833    9/2007
DE    102010051816    5/2012
(Continued)

*Primary Examiner* — Rhonda Peace
(74) *Attorney, Agent, or Firm* — Jacobson Holman, PLLC.

(57) ABSTRACT

The invention relates to a module that can be inserted into a housing of an industrial plug-in connector (5), into which module (1) at least one optical fiber connector (2) can be inserted and at least one adapter (3) can be inserted into the module (1), which adapter is connected to the optical fiber connector (2), wherein the adapter (3) contains an optical imaging element (11). In the plugged-in condition, the optical elements (11, 11'), for example the ball lenses proposed above, of two modules (1) are aligned with each other in such a way that the light signal exiting from the optical element (11) of the module of the first industrial plug-in connector (5) is coupled into the optical element (11') of the module (1') of the second industrial plug-in connector (5').

7 Claims, 3 Drawing Sheets

Figure 1:
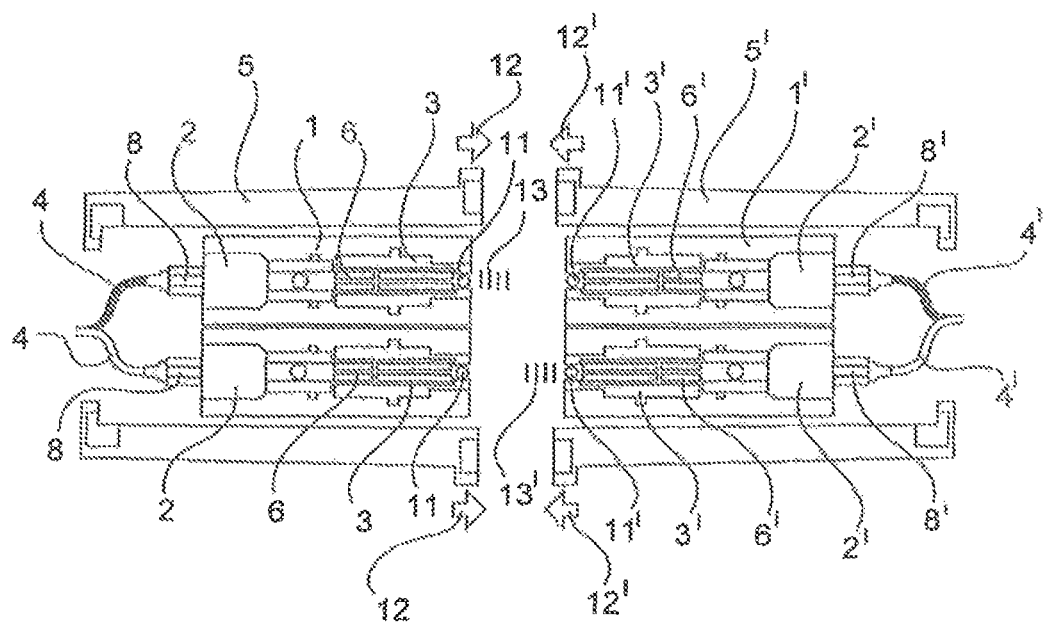

(58) Field of Classification Search
USPC .................................................. 385/35, 74
See application file for complete search history.

(56) References Cited

U.S. PATENT DOCUMENTS

| | | | | |
|---|---|---|---|---|
| 4,872,736 A * | 10/1989 | Myers | ................ | G02B 6/3878 385/60 |
| 5,016,970 A * | 5/1991 | Nagase | ................ | G02B 6/30 385/60 |
| 5,892,871 A * | 4/1999 | Dahan | ................ | G02B 6/3889 385/100 |
| 6,004,162 A | 12/1999 | Harting et al. | | |
| 6,234,683 B1 * | 5/2001 | Waldron | ................ | G02B 6/383 385/77 |
| 7,104,701 B1 * | 9/2006 | Durrant | ................ | G02B 6/3878 385/136 |
| 7,118,287 B2 * | 10/2006 | Perry | ................ | G02B 6/264 385/60 |
| 7,367,832 B2 * | 5/2008 | Muhs | ................ | G02B 6/3879 439/318 |
| 7,672,563 B2 * | 3/2010 | Beck | ................ | G02B 6/3825 385/134 |
| 7,744,286 B2 * | 6/2010 | Lu | ................ | G02B 6/3816 385/53 |
| 7,744,288 B2 * | 6/2010 | Lu | ................ | G02B 6/3816 385/60 |
| 7,762,726 B2 * | 7/2010 | Lu | ................ | G02B 6/3816 385/53 |
| 7,871,203 B2 * | 1/2011 | Iwaya | ................ | G02B 6/3879 385/55 |
| 9,025,917 B2 * | 5/2015 | Aoki | ................ | G02B 6/32 385/33 |
| 9,541,708 B2 * | 1/2017 | Hodge | ................ | G02B 3/0031 |
| 2002/0181887 A1 * | 12/2002 | Lindsey | ................ | G02B 6/262 385/61 |
| 2004/0028343 A1 * | 2/2004 | Hayasaka | ............ | G02B 6/3894 385/60 |
| 2004/0052472 A1 | 3/2004 | Roth et al. | | |
| 2004/0165833 A1 * | 8/2004 | Betker | ................ | G02B 6/3812 385/76 |
| 2004/0240826 A1 * | 12/2004 | Daoud | ................ | G02B 6/3897 385/135 |
| 2007/0211998 A1 | 9/2007 | Mehlegg et al. | | |
| 2007/0292096 A1 * | 12/2007 | Nielson | ................ | G02B 6/3875 385/138 |
| 2008/0279509 A1 | 11/2008 | Durrant et al. | | |
| 2009/0110347 A1 * | 4/2009 | Jacobsson | ................ | G02B 6/32 385/16 |
| 2009/0113047 A1 | 4/2009 | Fehners | | |
| 2009/0148101 A1 * | 6/2009 | Lu | ................ | G02B 6/3816 385/56 |
| 2009/0148102 A1 * | 6/2009 | Lu | ................ | G02B 6/3816 385/60 |
| 2009/0148103 A1 * | 6/2009 | Lu | ................ | G02B 6/3816 385/62 |
| 2009/0148104 A1 * | 6/2009 | Lu | ................ | G02B 6/3816 385/72 |
| 2009/0274432 A1 * | 11/2009 | Iwaya | ................ | G02B 6/3879 385/139 |
| 2009/0324175 A1 | 12/2009 | Everett et al. | | |
| 2010/0316337 A1 | 12/2010 | Zhovnirovsky et al. | | |
| 2012/0315782 A1 | 12/2012 | Herberschtsmeier et al. | | |
| 2013/0044978 A1 | 2/2013 | De Dobbelaere et al. | | |
| 2013/0301995 A1 * | 11/2013 | Thome | ................ | G02B 6/32 385/79 |
| 2016/0011376 A1 * | 1/2016 | Drescher | ................ | G02B 6/32 385/56 |

FOREIGN PATENT DOCUMENTS

| | | |
|---|---|---|
| EP | 0860906 | 5/2004 |
| EP | 1486808 | 12/2004 |
| EP | 1792217 | 6/2007 |
| EP | 2251725 | 11/2010 |
| EP | 2537212 | 12/2012 |
| JP | 2005-62513 | 3/2005 |
| WO | WO 2007/119036 | 10/2007 |

* cited by examiner

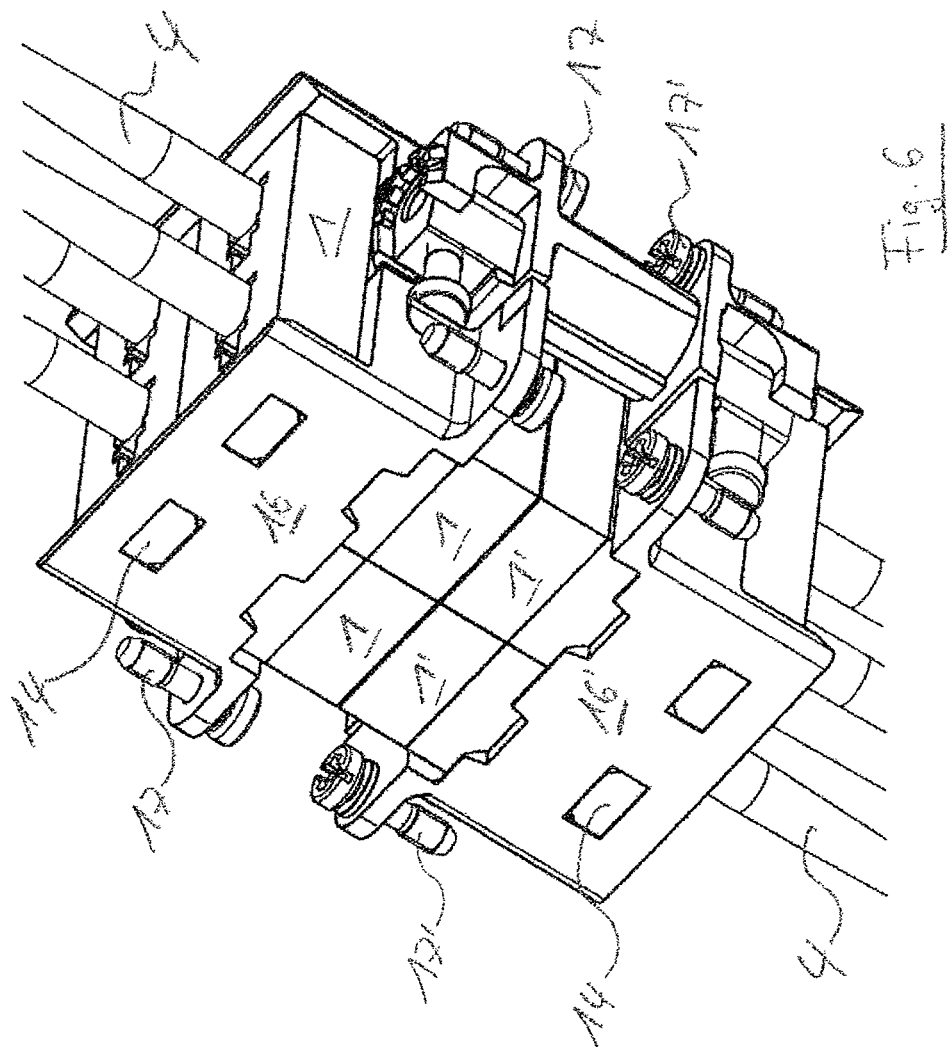

OPTICAL MODULE FOR INDUSTRIAL PLUG-IN CONNECTORS OF MODULAR DESIGN

The invention relates to a module that can be inserted into a housing of an industrial plug-in connector and that comprises at least one optical fibre connector.

From the prior art, further modules are also known which comprise for example electric contact elements or pneumatic contacts. Such modules are used to equip housings of industrial plug-in connectors. As a result, a number of different variations of industrial plug-in connectors can be created. The industrial plug-in connectors are known to a person skilled in the art also as Han connectors which are sold by the company HARTING.

PRIOR ART

DE 10 2010 051 816 A1 shows a cartridge in which an optical fibre connector is irreversibly fixed. The cartridge is pressed into a housing of a plug-in connector.

WO 2007 119 036 A1 also shows an optical fibre connector, the ferrule 32 of which is irreversibly bonded into the housing body.

EP 1 792 217 A1 shows an SC plug-in connector having a special housing, so that the plug-in connector can readily be assembled in the field. Here, the optical fibre is surrounded by a so-called ferrule. When two plug-in connectors are coupled, the end sides of each of the optical fibres (LWL) are pressed together. Through this interface, the light wave signals are transferred. Such a plug-in connector is also referred to in short as an optical fibre connector.

The coupling of the above-mentioned optical fibre connector has to be extremely precise. The end sides of the optical fibres have to be very precisely aligned to each other. This means that a large proportion (>95%) of the end surfaces has to overlap in order to ensure good signal transfer. In addition, the end sides must not be tilted relative to each other.

If one wants to couple a plurality of the above-mentioned optical fibre connectors in parallel, care has to be taken to ensure a precise alignment of each individual optical fibre connector coupling.

OBJECT OF THE INVENTION

It is the object of the invention to propose a module with an integrated optical fibre connector that can be integrated into a plug-in connector housing. By virtue of this module, the plug-in connector becomes less sensitive to environmental influences such as contamination, dust, shock or vibrations.

This object is achieved by the characterizing features of the independent claims.

Advantageous embodiments of the invention are indicated in the dependent claims.

The module according to the invention is intended for being inserted into a housing of an industrial plug-in connector. The modules can be inserted into the plug-in connector housing either directly or via a so-called hinged frame. EP 2537212 A1 discloses a plug-in connector housing having a plurality of lock-in points for modules. For example, EP 8 609 06 B1 shows a hinged frame, via which the modules can be introduced into the plug-in connector housing.

In the proposed module, an optical fibre connector can be locked in place. Advantageously, the locking is reversible, so that the optical fibre connector can be renewed or replaced with another plug.

Moreover, an adapter can be locked into the module, which is connected or attached to the optical fibre connector. Advantageously, the locking in of the adapter is also reversible.

The optical fibre connector and the adapter are in operative connection with each other. This means that the light signal exiting from the optical fibre connector is eventually coupled out via the adapter and/or the light signal entering the adapter is coupled into the optical fibre connector. The term light signal is often used in everyday language. A light signal is understood by a person skilled in the art to be an optical signal.

It is particularly advantageous if the module comprises fixing means, by means of which the module can be directly fixed in the housing of the industrial plug-in connector, and/or if the module can be fixed in a retaining frame using the fixing means, which retaining frame can in turn be fixed in the housing of the industrial plug-in connector. The fixing means is designed to be reversible. As a result, individual modules can be removed from the plug-in connector housing and can be replaced with another one.

The module proposed here is insensitive to environmental influences such as contamination, dust. Moreover, signal transfer is ensured during shock or vibrations.

In a particularly preferred embodiment of the invention, the adapter comprises, on the plug-in side, an optical imaging element that has a beam expanding effect on an incident light signal.

The optical imaging element preferably is a rod lens, particularly preferably however a ball lens. The latter has proved to be particularly insensitive to rough and dirty environments.

The ball lens is positioned in such a way that the light beam exiting from the optical fibre (for example a glass fibre cable) is expanded to a multiple of its original size and is parallelised.

Once an industrial plug-in connector has been plugged together with a second industrial plug-in connector, with both industrial plug-in connectors containing the optical module according to the invention, the optical elements, for example the ball lenses proposed above, of two modules are, in the plugged-in condition, aligned with each other in such a way that the light signal exiting from the optical element of the module of the first industrial plug-in connector is coupled into the optical element of the module of the second industrial plug-in connector.

If parallelised light (light signals) from an adapter impinges onto the ball lens of the opposite adapter, the impinging light signal is focused onto the optical fibre of the optical fibre connector.

By means of the optical elements of the adapters of the modules, slight deviations during the positioning of the modules relative to each other can be compensated. This is particularly necessary in the case of a modular plug-in connector as described above, because as a rule greater tolerances have to be compensated here than in the case of standard optical plug-in connectors. Especially the modular system according to EP 8 609 06 B1 requires modules with a certain degree of tolerance compensation. The modular system with a frame integrated into the plug-in connector housing as shown in EP 2 537 212 AO also has these tolerance problems. These problems are overcome in the module proposed here.

The signal transfer described above works in a contactless manner, without any physical contact, via a so-called air interface. Even if the ball lenses are slightly offset parallel (radially) to each other, a sufficient light strength for signal transfer is ensured due to the expansion of the light signal. Sufficient signal transfer is ensured even if the adapters are axially slightly tilted relative to each other.

It is advantageous to design the module in such a way that FC or LC or ST or SC plug-in connectors can equally be fixed. Advantageously, at least two different optical fibre connectors, for example an ST and an SC plug-in connector, can be fixed in the module. As a result, the module is versatile.

It is particularly advantageous if the module comprises a coupling that positions the ball lenses of two opposite adapters of different modules relative to each other. This may for example be a cylindrical element that covers the ball lens regions of the respective adapters. This coupling may be directly moulded onto the module.

EMBODIMENT EXAMPLE

An embodiment example of the invention is shown in the figures and will be explained in more detail below. The invention is not limited to the embodiment example shown here.

In the figures.

Figure 2:
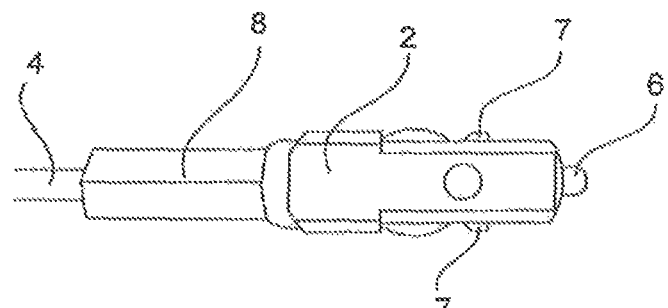
Figure 3:
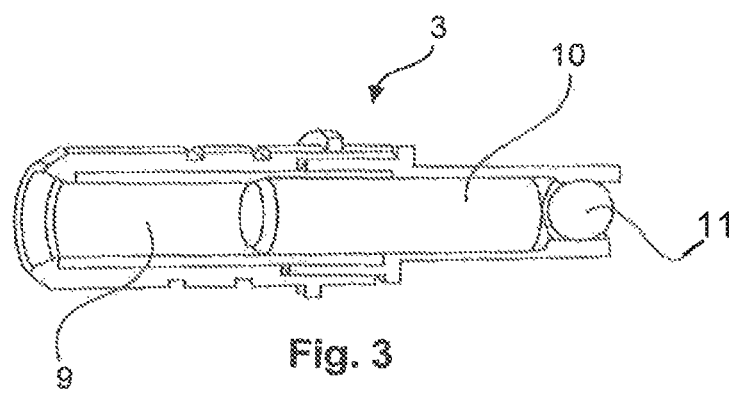
Figure 4:
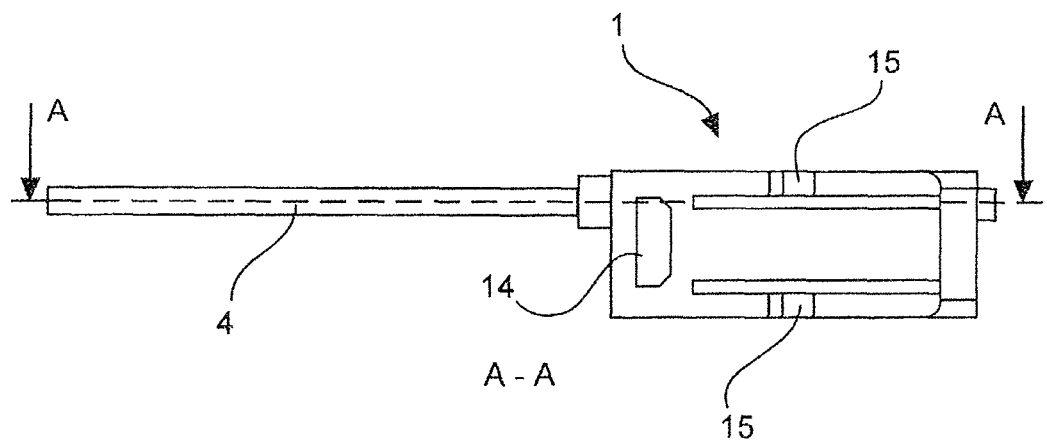
Figure 5:
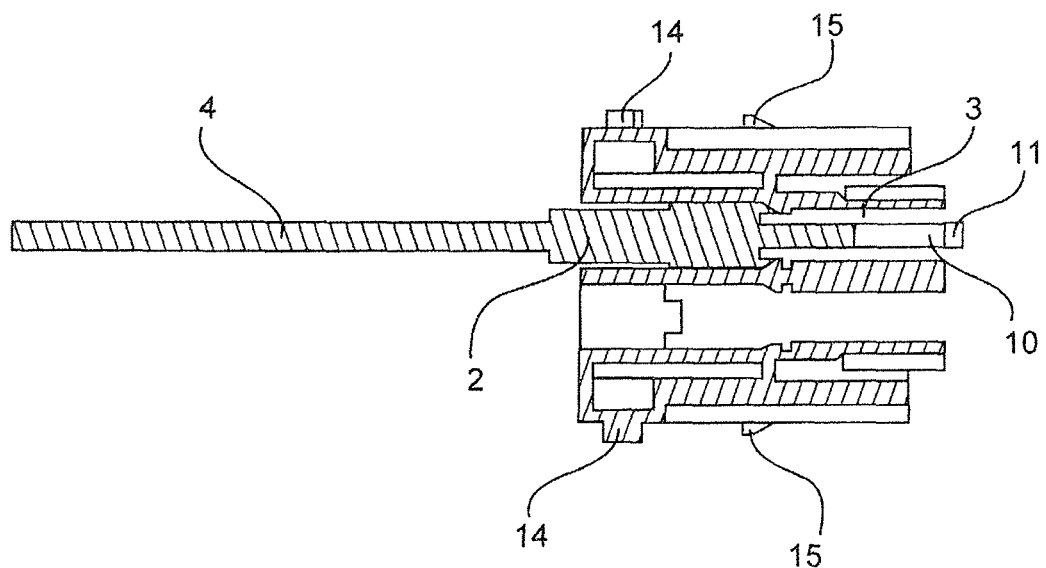

FIG. 1 shows a schematic view of two modules aligned with each other on the plug-in side, FIG. 2 shows a top view of an optical fibre connector, FIG. 3 shows a perspective, partially sectioned view of an adapter, FIG. 4 shows a lateral view of a module shown in detail, FIG. 5 shows a sectional view of the module, and FIG. 6 shows a perspective view of two retaining frames with plugged-in optical modules.

In FIG. 1, apart from unprimed, also primed reference numerals have been used. The unprimed reference signs relate to a plug-in connector and the primed reference signs relate to the mating counter plug-in connector. However, the primed reference numerals identify the same features or the same components as the unprimed reference signs and are therefore not specially listed in the claims.

The module 1, 1' according to the invention has substantially the same shape as a cuboid. On the connection side, an optical fibre connector 2, here a so-called SC connector, is locked into the module 1, 1'. The SC plug is used as standard for LAN connections and is therefore widespread.

On the plug-in side, a section of a ferrule 6 protrudes from the SC plug 2, in which a glass fibre for signal transfer is embedded. On the connection side, a glass fibre cable 4 is connected to the SC plug 2. For a reversible locking in of the module 1, 1', locking hooks 7 are moulded onto the housing body of the SC plug 2, which locking hooks engage in suitable recesses of the module 1, 1. In order to provide strain relief, the glass fibre cable 4 is crimped onto the housing body of the SC plug 2 by means of a metal sleeve 8.

On the plug-in side, an adapter 3 is locked into the module 1, 1. The adapter 3 is designed to be substantially cylindrical and has a sleeve-like region 9 that is intended to receive the section of the ferrule 6 that protrudes from the SC plug 2. The region 9 is followed by a ferrule piece 10 that extends up to a ball lens 11, which forms as it were the connector face of the adapter.

Once the optical fibre connector 2 and the adapter 3 are connected to each other, the end faces of the ferrule 6 of the optical fibre connector 2 and of the ferrule piece 10 of the adapter 3 are aligned with each other and are preferably also in physical contact with each other. Via the ferrules 6, 10, of course also the glass fibres embedded therein or the optical fibres are aligned with each other.

On the plug-in side, a ball lens 11 is provided in the adapter 3. The ball lens 11 directly follows the ferrule piece 10.

As can be seen in FIG. 1, the ball lenses 11, 11' of the opposite adapters 1, 1' are aligned with each other when two industrial plug-in connectors 5, 5' with integrated modules 1, 1' are connected to each other, for example via a locking clip. The plug-in direction of the industrial plug-in connectors 5, 5' is indicated by the arrows 12, 12'.

There is no touching contact between the plugged-in adapters 3, 3' of the modules 1, 1'. Signal transfer is here carried out via an air interface. In the connected condition, the industrial plug-in connectors 5, 5' are sealed by means of a seal (not shown). In this way, no dust can enter and block the air interface and as a result interfere with the signal transfer.

As has already been described above, the light beam exiting from the glass fibre or the glass fibre cable is expanded and parallelised. The respective parallel light signal 13, 13' is received by the ball lens 11, 11' of the opposite adapter 3, 3' and is projected onto the glass fibre of the optical fibre connector 2, 2'. The light signals can subsequently be converted into electric signals using an electro-optical converter.

FIGS. 4 and 5 show a specific embodiment of the module according to the invention, with FIG. 5 showing the section plane A-A from FIG. 4.

Module 1 is provided with webs 14 that can engage in recesses of a hinged frame for industrial plug-in connectors, as has already been mentioned above. Moreover, locking hooks 15 are provided, by means of which the module can be directly locked into an industrial plug-in connector. The web 14 and the locking hooks 15 may, during locking and/or fixing, also be used at the same time or in reverse order, depending on how the plug-in connector housing or the hinged frame is designed.

The essence of the invention relates to a module 1 that can be inserted into a housing of an industrial plug-in connector 5 and into which at least one optical fibre connector 2 is locked. Moreover, an adapter 3 is locked into the module 1, which surrounds the front section of the ferrule 6 of the optical fibre connector 2 and as a result is operatively connected to the optical fibre connector 2. The light signal is expanded and parallelised via a ball lens 11 contained in the adapter 3 and can thus be transferred to a counter-plug in a contactless manner.

The essence of the invention relates to a module that can be used in a housing of an industrial plug-in connector (5), wherein at least one optical fibre connector (2) can be inserted into the module (1) and at least one adapter (3) can be inserted into the module (1), which adapter is connected to the optical fibre connector (2), with the adapter (3) containing an optical imaging element (11). In the plugged-in condition, the optical elements (11, 11'), for example the ball lenses proposed above, of two modules (1) are aligned with each other in such a way that the light signal exiting from the optical element (11) of the module of the first industrial plug-in connector (5) is coupled into the optical element (11') of the module (1') of the second industrial plug-in connector (5').

FIG. 6 shows two retaining frames 16, in each of which two optical modules 1 are reversibly fixed via the webs 14.

The optical modules 1 are plugged together with the oppositely located optical modules 1' for signal transfer.

The retaining frames 16, 16' can be fixed in a plug-in connector housing (not shown) by means of screws 17, 17,

LIST OF REFERENCE NUMERALS

1 Module
2 Optical fibre connector
3 Adapter
4 Glass fibre cable
5 Industrial plug-in connector
6 Ferrule
7 Locking hook
8 Metal sleeve
9 Sleeve-like region
10 Ferrule section
11. Ball lens
12. Plug-in direction
13. Light signal
14. Web
15. Locking hook
16. Retaining frame
17. Screw

The invention claimed is:

1. An optical assembly, for an industrial plug-in connector, comprising
a module reversibly lockable to at least one of a housing of an industrial plug-in connector and a retaining frame for an industrial plug-in connector,
at least one optical fibre connector reversibly locked into the module, wherein said at least one optical fibre connector is an FC or LC or ST or SC plug-in connector, and, for each at least one optical fibre connector,
an adapter reversibly locked into the module and connected to the optical fibre connector and containing an optical imaging element, wherein the optical image element is a ball lens, a rod lens, or a combination thereof.

2. The assembly according to claim 1, wherein the at least one optical fibre connector is at least two different optical fibre connectors.

3. The assembly according to claim 1 further comprising a coupling, wherein the optical imaging elements of two opposite adapters of different modules are aligned with each other via the coupling.

4. An optical assembly, for an industrial plug-in connector, comprising
a module reversibly lockable to a retaining frame for an industrial plug-in connector,
at least one optical fibre connector reversibly locked into the module, and, for each at least one optical fibre connector,
an adapter reversibly locked into the module and connected to the optical fibre connector and containing an optical imaging element, and
a coupling, wherein the optical image elements of two opposite adapters of different modules are aligned with each other via the coupling.

5. The assembly according to claim 4, wherein the optical fibre connector is an FC or LC or ST or SC plug-in connector.

6. An industrial plug-in connector comprising an optical assembly reversibly locked therein, wherein the assembly comprises
a module reversibly lockable to at least one of a housing of an industrial plug-in connector and a retaining frame for an industrial plug-in connector,
at least one optical fibre connector reversibly locked into the module, and, for each at least one optical fibre connector,
an adapter reversibly locked into the module and connected to the optical fibre connector and containing an optical imaging element, and
a coupling, wherein the optical image elements of two opposite adapters of different modules are aligned with each other via the coupling.

7. The industrial plug connector of claim 6, wherein the optical fibre connector is an FC or LC or ST or SC plug-in connector.

* * * * *